Dec. 9, 1930.   E. E. McGREW   1,784,300
COMBINED SHADE AND AWNING
Filed Nov. 1, 1928
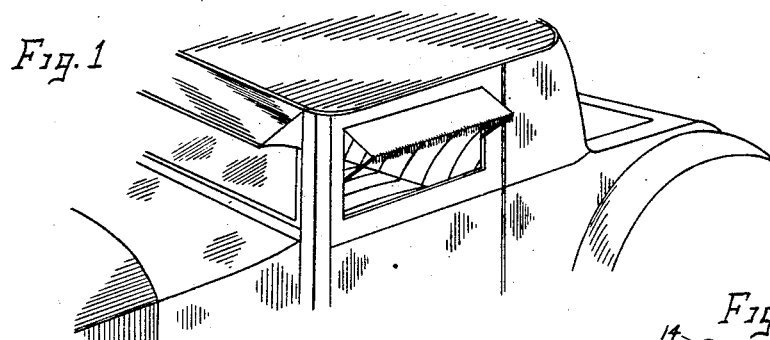
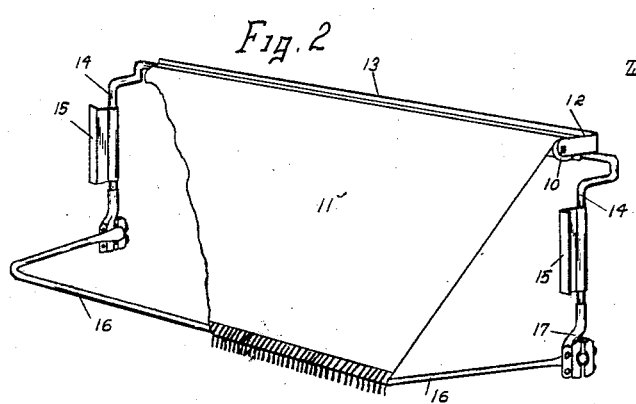
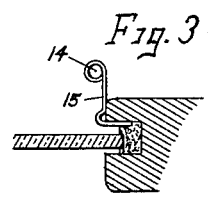
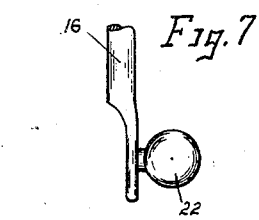
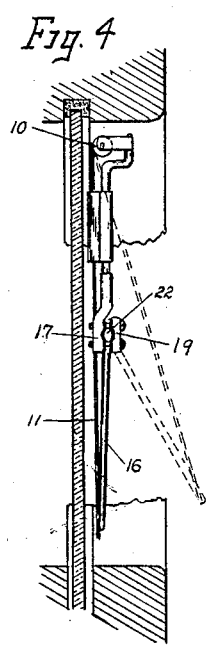
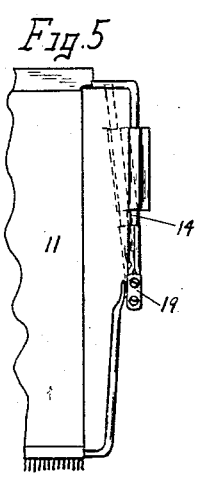
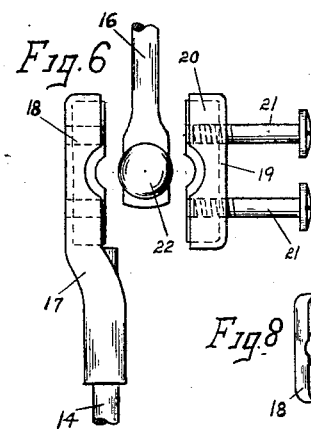
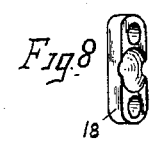
Inventor
E. E. McGREW
By Emil F. Lange
Attorney Patented Dec. 9, 1930

1,784,300

UNITED STATES PATENT OFFICE

EARL E. McGREW, OF LINCOLN, NEBRASKA, ASSIGNOR TO McGREW MACHINE COMPANY, OF LINCOLN, NEBRASKA, A CORPORATION OF NEBRASKA

COMBINED SHADE AND AWNING

Application filed November 1, 1928. Serial No. 316,435.

My invention relates to combined shades and awnings, the present invention being in the nature of an improvement on the construction which I have described and shown in my prior application Serial No. 212,472, filed August 12, 1927.

Owing to the numerous widths of automobile windows it is a difficult matter to supply awnings of all widths. For this reason a number of sizes are usually manufactured and stored, each size being designed to have a range of adjustment of several inches whereby it may be applied to cars having windows of various widths, thus reducing not only the manufacturing cost but also making it possible for the dealer to carry a smaller stock. My present invention has for its primary and only object the provision of means in an automobile awning for tensioning the joint to compensate for the tension of the spring in the roller, the tension in the joint being equally effective regardless of the width of the automobile window within the limits of adjustability of the awning. Specifically it is the object of my invention to provide a friction joint whereby the awning or shade will be held under tension in all positions of the awning or shade, the joint being so designed as to involve little or no wear and so as to function regardless of the degree of compression of the members which secure the awning frame in the window opening of an automobile.

Having in view these objects and others which will be pointed out in the following description, I will now refer to the drawings, in which Figure 1 is a perspective view of a portion of an automobile with my combined awning and shade secured thereto.

Figure 2 is a view in perspective of the awning alone, the device being opened to its awning position and part of the fabric being torn away to disclose the frame construction.

Figure 3 is a sectional view transversely through the window and window jamb of an automobile and showing the manner in which the awning frame is secured thereto.

Figure 4 is a view in vertical section through an automobile window having my device secured thereto, two alternative positions of the awning being shown.

Figure 5 is a plan view of one side of the awning frame in its shade position and showing particularly one of the movements of the joint.

Figure 6 is a view partly in elevation and partly in section showing the three members of the joint with their fastening means.

Figure 7 is a view in side elevation of the ball member of the joint and its connection.

Figure 8 is a view in perspective of the friction socket member of the joint.

The present awning like the one described in my prior application is intended for use on the inner side of an automobile to be used either as a shade or as an awning. The roller type of awning is employed, the spring roller being shown at 10 and the awning or shade itself being shown at 11. The spring roller is secured to the wings 12 of a supporting member 13, these being all similar to the corresponding parts shown in my prior application with the exception that the supporting member in the present instance is positioned inwardly instead of downwardly with respect to the roller 10. The frame for holding the support 13 comprises two vertical members 14 which are first bent inwardly with respect to the car and then turned toward each other into the support 13 where they are held in spaced apart relation by means of a spring. Secured to the arms 14 are clips 15 having narrow tongues for entering narrow slits in the window jambs as shown in Figure 3. A bail 16 is hinged at its extremities to the members 14 at their lower extremities and the middle portion of the bail 16 has secured thereto the awning web 11. Thus far the device is similar in most respects to that described in my prior application and it is apparent that the lowering of the middle portion of the bail 16 will cause the awning web to unroll from the roller 10 in the same manner as that of the prior construction. It will also be apparent that the movement of the bail may be continued until the awning web 11 is in vertical position to serve as a shade.

The device is thus secured entirely inside the car where it cannot be stolen if the window is shut. If it is desired to use it as a shade, this may be done by simply lowering the bail 16 in the manner shown in Figure 4, and since the movement takes place entirely inside the car it is not necessary to open the window for this purpose. If the awning is to be used as an awning, it is necessary to open the window a sufficient distance to swing the bail 16 out through the opening. The movement, however, takes place in the direction the reverse of that shown in Figure 4, thus necessitating only a slight opening of the window. The window may then be kept open or it may be almost entirely closed, thus shading the occupants of the car even in cold weather in winter.

In adapting the awning to windows of various widths the arms 14 are forced toward each other under the compression of the spring in the support 13 so as to clip the lips 15 into place in the window jambs. This compression also results in a compression of the arms of the bail 16 and with it there is a change of angle of the pivot itself. The friction washers described in my prior application serve admirably to counter-balance the tension of the spring in the roller 10 but when the pivotal angle is materially altered, the friction washers bind so that the adjustment of the bail about its pivot is not as free and easy as it should be. To overcome this difficulty I provide a pivotal connection between the arms 14 and the arms of the bail 16, the structure of the pivotal connection being best shown in Figures 6, 7 and 8. The arms 14 are each provided with an extension 17 having a sheath portion embracing the lower end portion of the rod 14 and having one portion of a bearing member at the lower extremity as shown in Figure 6. The bearing portion includes a socket for receiving the friction bearing member 18 which is best shown in Figure 8. Cooperating with the bearing member of the extension 17 is a clamping member 19 also having a friction bearing member 20 similar to the bearing member 18. The friction bearing members 18 and 20 are each provided with a socket having the form of the section of a sphere and they are each provided with a pair of apertures for the reception of the fastening devices 21. When assembled the friction bearing members 18 and 20 embrace a ball 22 which projects laterally from the free extremity of the arm of the bail 16.

The ball 22 is preferably made from a relatively hard metal. If the metallic ball 22 were, however, in frictional engagement in the socket of a metallic friction clamp considerable trouble would arise from abrasion of the parts and from undue wear on the parts thus necessitating frequent adjustments to compensate for the wear and in order to maintain the balance between the friction of the joint and the tension of the shade roller spring. For this reason it is important that the friction bearing members 18 and 20 be made from material which is free from the drawbacks inherent in an all-metal friction clamp. A number of substances are useful in varying degrees for the making of the friction bearing members 18 and 20 but I have found that the material commonly known as "composition" is admirably suited for this purpose. This material is subjected to very little wear under the movement of the ball in the sockets but it maintains the compression for long periods of time so that there is no need for frequent adjustments. It is evident, however, that wood blocks and other fibrous materials would accomplish the same purpose.

Having thus described my invention in such full, clear, and exact terms that its construction and operation will be readily understood by others skilled in the art to which it pertains, what I claim as new and desire to secure by Letters Patent of the United States is:

1. In an awning construction including a horizontal support for the upper edge of an awning web, a pair of resilient members depending from the support at the opposite extremities thereof, the members being adapted to be seated against the jambs of a window and being movable toward and away from each other to adapt the awning frame to window openings of various widths, the awning construction also including a resilient bail for supporting the lower edge of the awning web, and a ball and socket joint connecting one of the extremities of the bail with one of the depending members.

2. In an awning construction, the combination with a window jamb engaging frame adapted to be seated in a window for supporting at the upper end the upper edge of an awning web, and a movable frame for attachment to the lower edge of the awning web, universal connections between the lower portions of said frames for interconnecting the same.

3. In an awning construction, the combination with a pair of adjustable frames for an awning web adapted to be fitted to windows of different sizes, universal connections between the meeting side portions of the frames for interconnecting the same to maintain the pivotal axes of the frames at opposite sides thereof in alinement irrespective of the relative independent adjustments of the frames.

In testimony whereof I affix my signature.

EARL E. McGREW.